United States Patent
Seger et al.

(10) Patent No.: US 12,291,405 B2
(45) Date of Patent: May 6, 2025

(54) DEVICE FOR INTERMEDIATELY STORING AND CONVEYING CONTAINERS AT LEAST IN ONE CONVEYING DIRECTION

(71) Applicant: Krones AG, Neutraubling (DE)

(72) Inventors: Martin Seger, Neumarkt i. d. Opf. (DE); Michael Jogsch, Barbing (DE); Reiner Kahl, Donaustauf (DE); Nicolò Verza, Garda (IT)

(73) Assignee: Krones AG, Neutraubling (DE)

( * ) Notice: Subject to any disclaimer, the term of this patent is extended or adjusted under 35 U.S.C. 154(b) by 83 days.

(21) Appl. No.: 18/303,510

(22) Filed: Apr. 19, 2023

(65) Prior Publication Data

US 2023/0339702 A1 Oct. 26, 2023

(30) Foreign Application Priority Data

Apr. 20, 2022 (DE) .......................... 102022109584.3

(51) Int. Cl.
| | |
|---|---|
| *B65G 47/71* | (2006.01) |
| *B65G 1/04* | (2006.01) |
| *B65G 47/68* | (2006.01) |

(52) U.S. Cl.
CPC .............. *B65G 47/71* (2013.01); *B65G 1/04* (2013.01); *B65G 47/682* (2013.01)

(58) Field of Classification Search
CPC ......... B65G 1/04; B65G 47/682; B65G 47/71
USPC ...................................................... 198/347.4
See application file for complete search history.

(56) References Cited

U.S. PATENT DOCUMENTS

| | | | |
|---|---|---|---|
| 6,609,605 B1* | 8/2003 | Linder ............... | B65G 47/5104 |
| | | | 198/347.4 |
| 9,272,850 B2 | 3/2016 | Goudy et al. | |
| 9,676,560 B2 | 6/2017 | Senn et al. | |
| 10,343,850 B2* | 7/2019 | Rabec ..................... | B65G 47/52 |
| 2010/0038210 A1* | 2/2010 | Cox ........................ | B65G 47/71 |
| | | | 198/460.1 |
| 2016/0046452 A1 | 2/2016 | Parker et al. | |
| 2016/0052726 A1* | 2/2016 | Steeber .............. | B65G 47/5127 |
| | | | 198/347.4 |
| 2024/0010443 A1* | 1/2024 | Priero .................. | B65G 47/265 |

(Continued)

FOREIGN PATENT DOCUMENTS

| | | |
|---|---|---|
| CH | 673627 A5 | 3/1990 |
| DE | 102013218394 A1 | 3/2015 |
| DE | 102014224550 A1 | 6/2016 |

(Continued)

OTHER PUBLICATIONS

Search Report dated Sep. 15, 2023 in connection with European Application No. 23155942.8, 16 pages.

(Continued)

*Primary Examiner* — James R Bidwell

(57) ABSTRACT

A device for intermediately storing and conveying containers in at least one conveying direction includes a multi-row intermediate storage device. The device also includes container outlet lanes arranged, in a conveying direction, downstream of the multi-row intermediate storage device. The device also includes at least one movable container outlet link each configured to receive containers from at least one row of the multi-row intermediate storage device, and to discharge and distribute the containers to a plurality of the container outlet lanes.

19 Claims, 4 Drawing Sheets

(56) References Cited

U.S. PATENT DOCUMENTS

2024/0067462 A1* 2/2024 Priero ................ B65G 47/5127

FOREIGN PATENT DOCUMENTS

| | | | |
|---|---|---|---|
| DE | 102017211901 A1 | 1/2019 | |
| EP | 2246277 A2 | 11/2010 | |
| EP | 3401247 A1 * | 11/2018 | ......... B65G 47/5113 |
| EP | 3450359 A1 | 3/2019 | |
| FR | 2835819 A1 | 8/2003 | |
| FR | 2993870 A1 | 1/2014 | |
| JP | 7267351 * | 10/1995 | ............. B65G 47/68 |
| WO | WO-2021070128 A1 * | 4/2021 | ......... B65G 47/5104 |

OTHER PUBLICATIONS

German Patent and Trademark Office, "Search Report", Application No. 102022109584.3, Dec. 6, 2022, 6 pages.

* cited by examiner

DEVICE FOR INTERMEDIATELY STORING AND CONVEYING CONTAINERS AT LEAST IN ONE CONVEYING DIRECTION

CROSS-REFERENCE TO RELATED APPLICATION(S) AND CLAIM OF PRIORITY

This application claims priority to German Patent Application No. 102022109584.3, filed Apr. 20, 2022, the disclosure of which is incorporated herein by reference in its entirety.

TECHNICAL FIELD

The invention relates to a device for intermediately storing and conveying containers at least in one conveying direction.

BACKGROUND

DE 10 2017 211 901 A1 discloses a device for conveying and intermediately storing articles having an article inlet stream divider for dividing a single-track inlet stream to at least two article travel paths and having a movable article inlet distributor associated with the article inlet paths. The article inlet distributor can distribute articles from the associated article inlet path to at least one intermediate storage device, for example, a multi-row buffer table.

For certain types of containers, it can be necessary to transport the containers in lanes, and not, for example, partially by mass transport. By introducing the containers from inlet lanes to a multi-row buffer table, and discharging of the containers from the multiple rows into individual lanes, a high space requirement can result for such a plant.

SUMMARY

This disclosure provides a device for intermediately storing and conveying containers at least in one conveying direction.

It is the object of this disclosure to provide a device that permits space-saving and inexpensive supplying, buffering, and discharging of containers. The object is achieved by the device according to embodiments of this disclosure.

The device for intermediately storing and conveying containers at least in one conveying direction comprises a multi-row intermediate storage device and a plurality of container outlet lanes arranged, in the conveying direction, downstream of the multi-row intermediate storage device. Moreover, the device comprises at least one movable container outlet link which is each designed to receive containers from at least one row of the multi-row intermediate storage device, to discharge and to distribute them to a plurality of the container outlet lanes.

By means of the movable container outlet link, it is possible to transfer, in a compact design of the device, containers transported in lanes from the intermediate storage device to single-track container outlet lanes.

The at least one movable container outlet link can comprise movable rails to distribute containers from one row to the plurality of the container outlet lanes. For example, pneumatic rails or actuators can be provided. Containers that are received from a row by the container outlet link and are discharged can be distributed to different container outlet lanes, preferably 3 to 8 lanes, and particularly preferred 4 to 6 lanes, by adjusting the movable rails. Container outlet links with movable rails can be provided which can distribute containers to two, three, four or more container outlet lanes.

The at least one movable container outlet link can be designed to be movable in parallel to the rows of the multi-row intermediate storage device to distribute containers from one row to the plurality of the container outlet lanes. A movement of the container link can here be affected by a distance corresponding to a width or a multiple of the width of a container outlet lane.

The at least one movable container outlet link can be designed to be movable in parallel to the container outlet lanes to distribute containers from a plurality of rows to the plurality of the container outlet lanes. A movement of the container link can here be affected by a distance corresponding to a width or a multiple of the width of a row.

The at least one movable container outlet link can be designed to distribute containers from a first number of rows to the first number of container outlet lanes, wherein the first number can be greater than one. The first number of rows can each be arranged one next to the other. As an alternative, it is possible that not all rows of the first number of rows are arranged one next to the other. The first number of container outlet lanes may each be arranged one next to the other. As an alternative, it is possible that not all container outlet lanes of the first number of container outlet lanes are arranged one next to the other.

The device can furthermore comprise at least one robot that can be designed to manipulate the at least one movable container outlet link. The manipulation can comprise a movement of the container outlet link by the robot in two or three spatial dimensions. A movement of the movable rails can also be performed by the robot.

One of the at least one robot each can be associated with one of the at least one movable container outlet link.

The device can furthermore comprise at least one movable container outlet link not used by the at least one robot. The non-used movable container outlet links can have, for example, different designs and be available, for example, depending on the requirement for a use in the device.

The at least one robot can furthermore be designed to exchange the movable container outlet link associated with it for one of the at least one movable container outlet link not used by the at least one robot. To this end, the robot can put down the container outlet link associated with it, for example at a location provided for this, and subsequently pick up a non-used container link and then manipulate it for receiving, discharging, and distributing containers to a plurality of container outlet lanes.

The device can comprise two or more multi-row intermediate storage devices. For example, reduced container transport speeds can be optimally utilized.

The device can comprise at least one container inlet lane that can be arranged, in the conveying direction, upstream of the multi-row intermediate storage device.

The device can comprise at least one movable container inlet link which can each be designed to receive containers from one of the at least one container inlet lanes, to discharge and transfer them to at least one row of the multi-row intermediate storage device.

The device can furthermore comprise at least one robot that can be designed to manipulate the at least one movable container inlet link. The robot can be identical in design to the robot that can be designed to manipulate the at least one movable container outlet link.

One of the at least one robot each can be associated with one of the at least one movable container inlet link each.

The device can furthermore comprise at least one movable container inlet link not used by the at least one robot. For example, the at least one robot can furthermore be designed to exchange the movable container inlet link associated with it for one of the at least one movable container inlet link not used by the at least one robot. The non-used movable container inlet links can have, for example, different designs and be available, for example, depending on the requirement for a use in the device.

If two movable container outlet links are employed, the positioning is preferably alternate, so that containers are guided over one container outlet link while the other container outlet link is being moved, and vice versa. If more than two container outlet links are provided, the same applies. While containers are guided via at least one container outlet link, the other one or the other container outlet links, respectively, are moved.

BRIEF DESCRIPTION OF THE DRAWINGS

The included figures represent, by way of example, aspects and/or embodiments of the invention for a better understanding and for illustration purposes. In the drawings.

DETAILED DESCRIPTION

Figure 1:
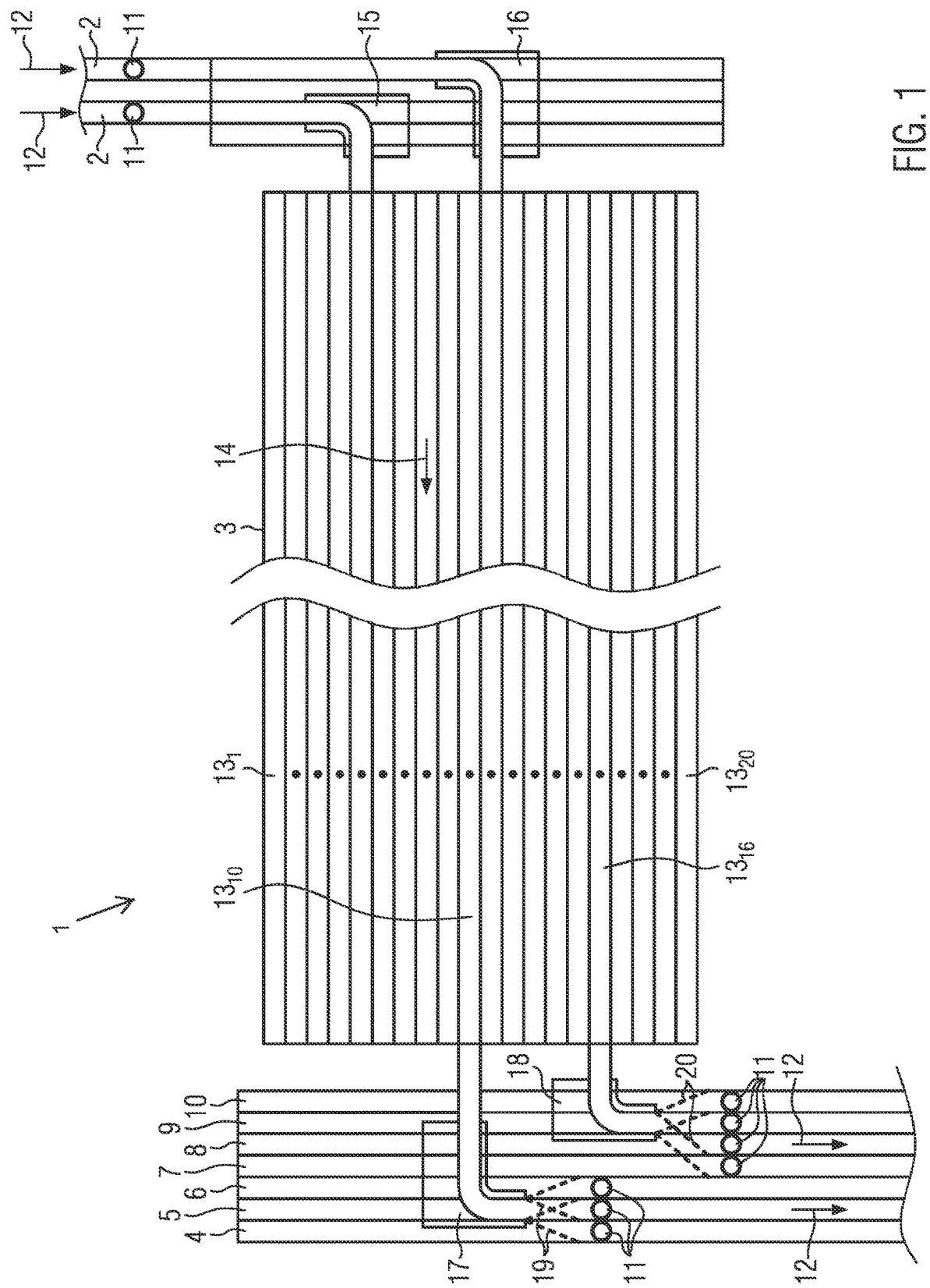
FIG. 1 illustrates a first embodiment of the device.

FIG. 1 illustrates a first embodiment of the device 1 with two container inlet lanes, one multi-row intermediate storage device 3 and seven container outlet lanes 4, 5, 6, 7, 8, 9, 10 arranged in parallel. The direction of transport of containers 11 can be in the container inlet lanes 2 and the container outlet lanes 4 to 10 in a first direction 12, and in the rows 13 of the multi-row intermediate storage device 3 in a second direction 14 that extends transversely, here perpendicularly, to the first direction 12.

The device 1 furthermore comprises two movable container inlet links 15, 16 which are each designed to receive containers 11 from one of the container inlet lanes 2, to discharge and to transfer them to at least one row $13_1$-$13_{20}$ of the multi-row intermediate storage device 3. The container inlet links 15, 16 can be moved in the first direction 12 or opposite to the first direction 12 to this end. In the representation, one of the movable container inlet links 15, 16 each is associated with one of the container inlet lanes 2.

The device 1 furthermore comprises two movable container outlet links 17, 18 which are designed to receive containers 11 from one row $13_1$-$13_{20}$ of the multi-row intermediate storage device 3, to discharge and to distribute them to a plurality of the container outlet lanes 4 to 10. To this end, the represented container links 17, 18 comprise movable rails 19, 20 to distribute containers 11 from one row $13_1$-$13_{20}$ to a plurality of container outlet lanes 4 to 10. The one container outlet link 17 is designed to distribute containers 11 from one row $13_{10}$ to three container outlet lanes 4 to 6, and the other container outlet link 18 is designed to distribute containers 11 from one row 1316 to the four container outlet lanes 7 to 10. To this end, the movable rails 19, 20 of the respective container outlet link 17, 18 can be moved correspondingly to direct the path of a container 11 into one of the desired three or four container outlet lanes 4 to 6, 7 to 10, respectively. It might also be possible that two container outlet links are provided which distribute containers from one row each to a same number of container outlet lanes. In order to receive containers 11 one after another from different rows $13_1$-$13_{20}$, to discharge them and to be able to distribute them to a plurality of the container outlet lanes 4 to 10, the container outlet links 17, 18 can be moved in or opposite to the first direction 12.

Figure 2:
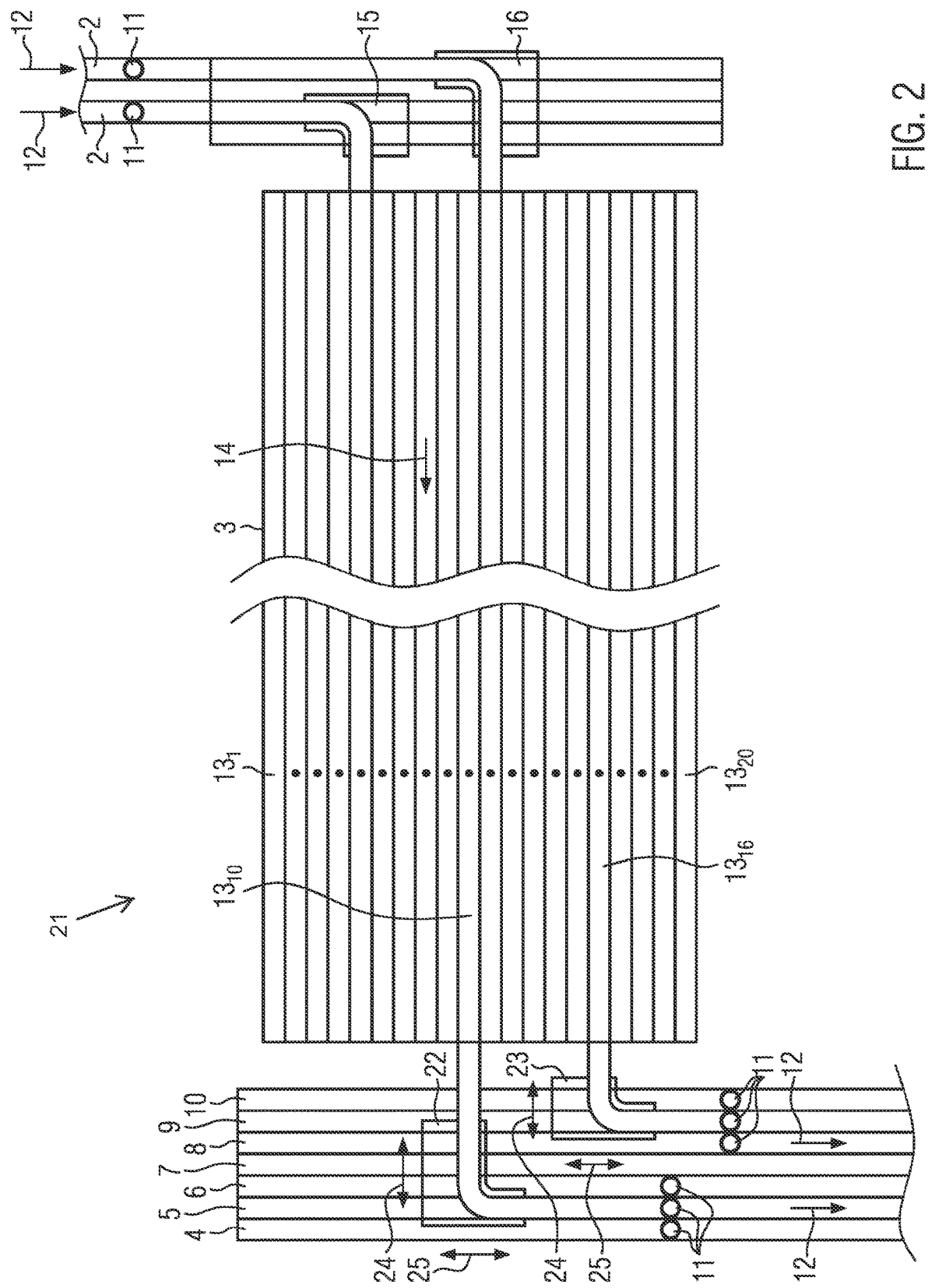
FIG. 2 illustrates a second embodiment of the device.

FIG. 2 illustrates a second embodiment of the device 21, wherein elements that have already been described with respect to FIG. 1 have the same reference numerals and are not described again. The movable container outlet links 22, 23 of the second embodiment differ from those of the first embodiment.

The two movable container outlet links 22, 23 are also designed to receive containers 11 from one row $13_1$-$13_{20}$ of the multi-row intermediate storage device 3, to discharge and to distribute them to a plurality of the container outlet lanes 4 to 10. To this end, the container outlet links 22, 23 are, in the second embodiment, designed to be movable in a direction 24 parallel to the rows $13_1$-$13_{20}$ of the multi-row intermediate storage device 2, and in a direction 25 parallel to the container outlet lanes 4 to 10. It is provided that each one of the container outlet links 22, 23 distribute containers 11 from one row $13_1o$, 1316 to three container outlet lanes 4 to 6, 8 to 10.

Figure 3:
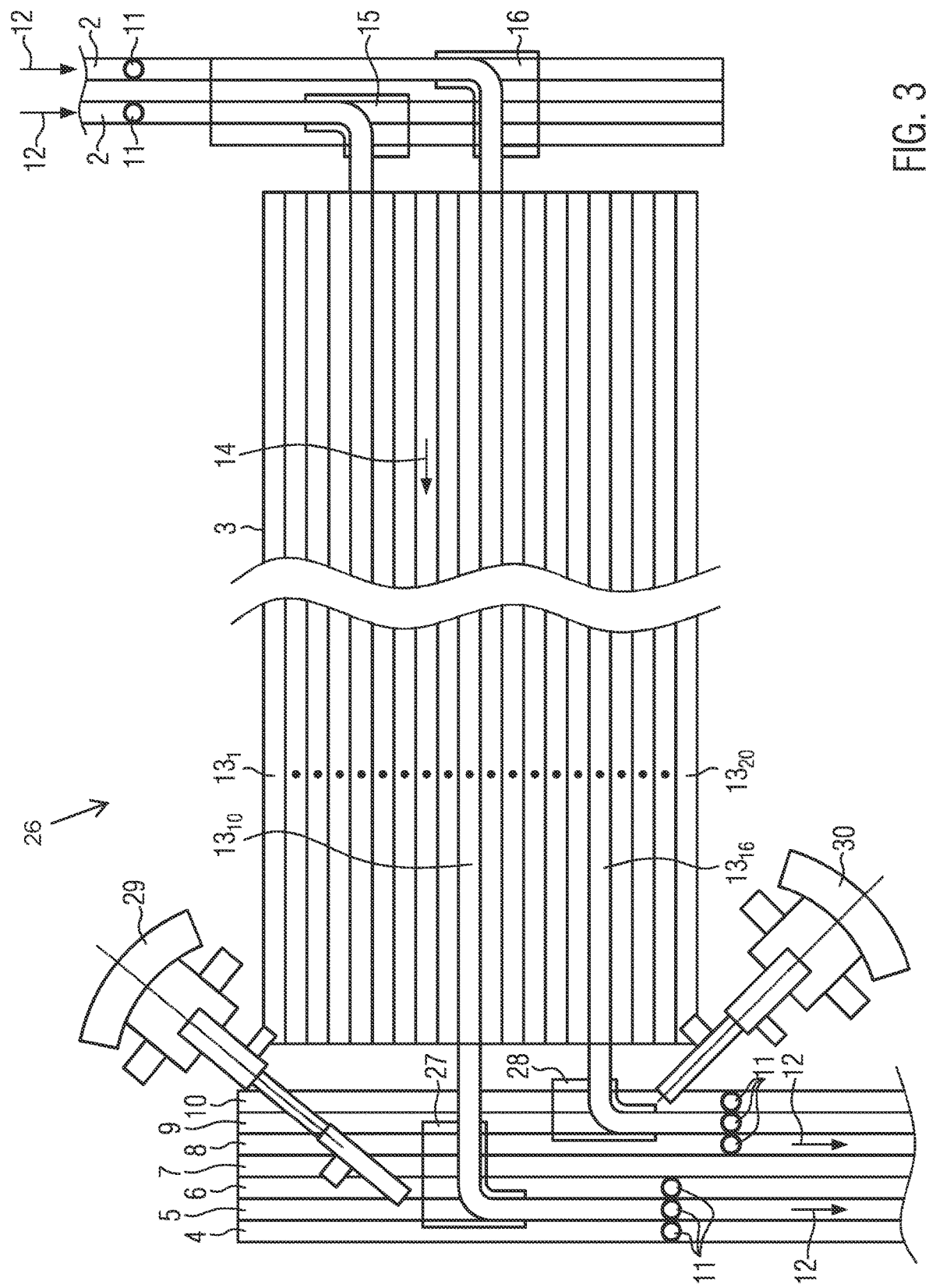
FIG. 3 illustrates a third embodiment of the device.

FIG. 3 illustrates a third embodiment of the device 26, wherein elements that have already been described with respect to FIGS. 1 and 2 have the same reference numerals and are not described again. The represented device 26 essentially corresponds to the second embodiment wherein, however, two robots 29, 30 are included additionally. One robot 29, 30 each is here associated with one of the two container outlet links 27, 28, wherein each one of the robots 29, 30 is designed to manipulate the container outlet link 27, 28 associated with it. To this end, the robots 29, 30 can be movable at least in a plane parallel to a transport surface of the rows $13_1$-$13_{20}$ of the multi-row intermediate storage device 3 to be able to move the container outlet links 27, 28, for example in directions parallel to the rows $13_1$-$13_{20}$ or parallel to the container outlet lanes 4 to 10.

In a possible movement in the three spatial dimensions, the robots 29, 30 can moreover be designed to exchange the container outlet link 27, 28 associated with it for another container outlet link, for example, if a container outlet link is to be used as described in FIG. 1.

Figure 4:
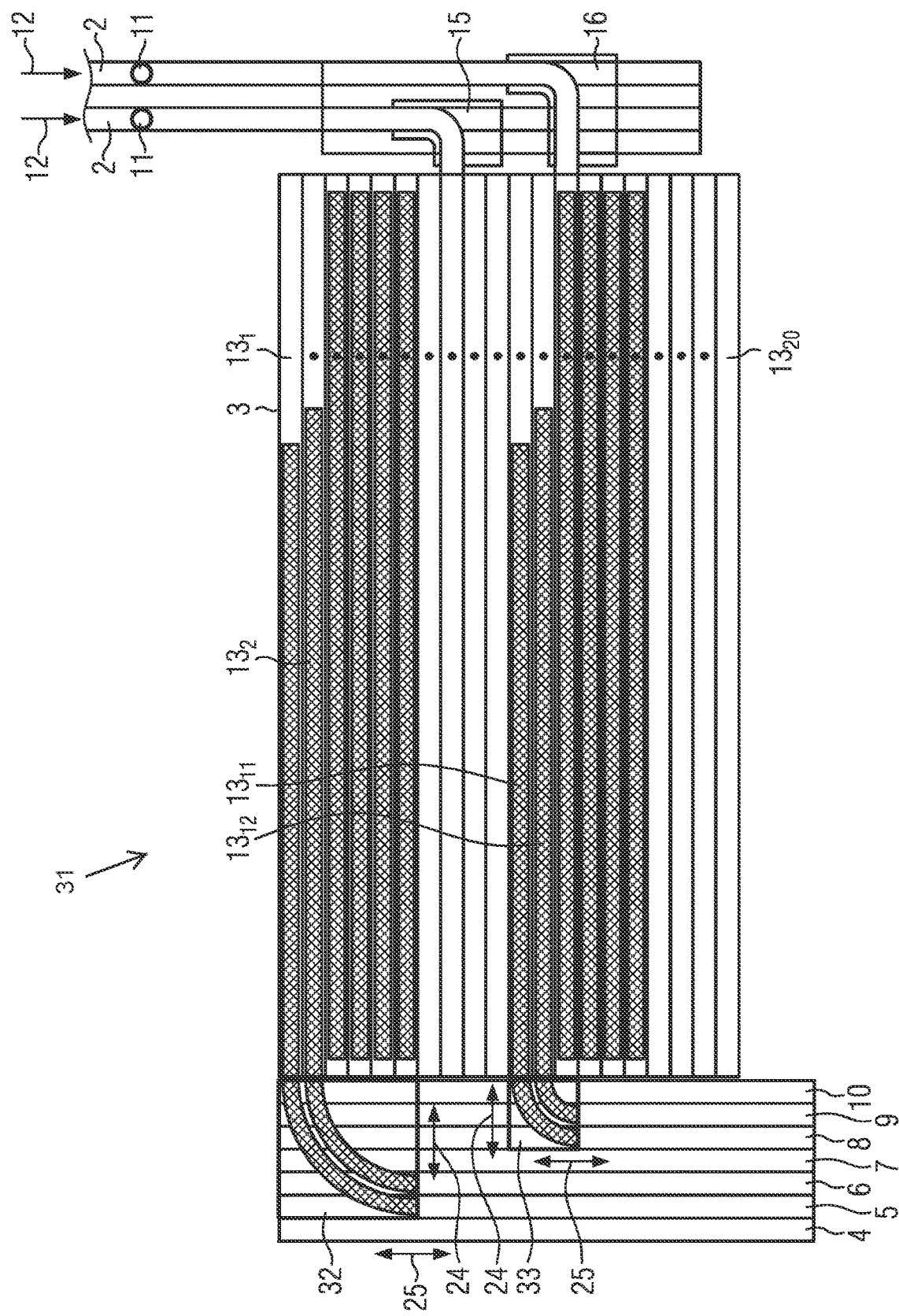
FIG. 4 illustrates a fourth embodiment of the device.

FIG. 4 illustrates a fourth embodiment of the device 31, wherein elements that have already been described with respect to FIGS. 1, 2 and 3 have the same reference numerals and are not described again.

The two container outlet links 32, 33 differ from those that have been described with respect to the first to third embodiments. Each one of the container outlet links 32, 33 is designed to distribute containers 11 from two adjacent rows $13_1$, $13_2$; $13_{11}$, $13_{12}$ of the multi-row intermediate storage device 3 to two adjacent container outlet lanes 5, 6; 8, 9. To be able to distribute containers 11 from different two adjacent rows $13_1$-$13_{20}$ to two adjacent container outlet lanes 4 to 10, the container outlet links 32, 33 can be moved in the direction 25 parallel to the container outlet lanes 4 to 10. To be able to distribute containers 11 from two adjacent rows $13i$-$13_{20}$ to different two adjacent container outlet lanes 4 to 10, the container outlet links 32, 33 can be moved in the direction 24 parallel to the rows $13_1$-$13_{20}$.

What is claimed is:
1. A device for intermediately storing and conveying containers in at least one conveying direction, comprising:
a multi-row intermediate storage device;

container outlet lanes arranged, in a conveying direction, downstream of the multi-row intermediate storage device; and at least one movable container outlet link configured to receive containers from at least one row of the multi-row intermediate storage device, and to discharge and distribute the containers to a plurality of the container outlet lanes, wherein the at least one movable container outlet link is configured to be movable in a direction parallel to the at least one row of the multi-row intermediate storage device to distribute containers one after another from one of the at least one row to the plurality of the container outlet lanes.

2. The device of claim 1, wherein the at least one movable container outlet link comprises movable rails to distribute the containers received from the at least one row to the plurality of the container outlet lanes, wherein the movable rails include pneumatic rails or actuators.

3. The device of claim 1, wherein the at least one movable container outlet link is configured to be movable in a direction parallel to the plurality of the container outlet lanes to distribute containers one after another from a plurality of rows of the multi-row intermediate storage device to the plurality of the container outlet lanes.

4. The device of claim 1, wherein the at least one movable container outlet link is configured to distribute containers from a number of the at least one row to a number of the plurality of the container outlet lanes.

5. The device of claim 1, further comprising at least one robot configured to manipulate the at least one movable container outlet link.

6. The device of claim 5, wherein each of the at least one robot is associated with at least one of the at least one movable container outlet link.

7. The device of claim 5, wherein one of the at least one movable container outlet link is not used by the at least one robot.

8. The device of claim 7, wherein the at least one robot is further configured to exchange the at least one movable container outlet link associated with the at least one robot for the one of the at least one movable container outlet link not used by the at least one robot.

9. The device of claim 1, further comprising two or more multi-row intermediate storage devices.

10. The device of claim 1, further comprising at least one container inlet lane that is arranged, in the conveying direction, upstream of the multi-row intermediate storage device.

11. The device of claim 10, further comprising at least one movable container inlet link each configured to receive containers from one of the at least one container inlet lane, and to discharge and transfer the containers to one or more rows of the multi-row intermediate storage device.

12. The device of claim 11, further comprising at least one robot configured to manipulate the at least one movable container inlet link.

13. The device of claim 12, wherein each of the at least one robot is associated with one of the at least one movable container inlet link.

14. The device of claim 13, wherein one of the at least one movable container inlet link is not used by the at least one robot, wherein the at least one robot is further configured to exchange the one of the at least one movable container inlet link associated with the at least one robot for the one of the at least one movable container inlet link not used by the at least one robot.

15. The device of claim 2, wherein the at least one movable container outlet link is configured to be movable in a direction parallel to the at least one row of the multi-row intermediate storage device to distribute containers one after another from one of the at least one row to the plurality of the container outlet lanes.

16. The device of claim 15, wherein the at least one movable container outlet link is configured to be movable in a direction parallel to the plurality of the container outlet lanes to distribute containers one after another from a plurality of rows of the multi-row intermediate storage device to the plurality of the container outlet lanes.

17. The device of claim 16, wherein the at least one movable container outlet link is configured to distribute containers from a number of the plurality of rows to a number of the plurality of the container outlet lanes.

18. The device of claim 17, further comprising at least one robot associated with one of the at least one movable container outlet link, wherein the at least one robot is configured to manipulate the associated one of the at least one movable container outlet link.

19. The device of claim 18, wherein the at least one robot is further configured to exchange the associated one of the at least one movable container outlet link for one of the at least one movable container outlet link not used by the at least one robot.

* * * * *